United States Patent
Skowronski

(10) Patent No.: US 6,294,842 B1
(45) Date of Patent: *Sep. 25, 2001

(54) FOG CYCLE FOR MICROTURBINE POWER GENERATING SYSTEM

(75) Inventor: Mark J. Skowronski, Tustin, CA (US)

(73) Assignee: AlliedSignal Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,409

(22) Filed: Jul. 15, 1999

Related U.S. Application Data

(63) Continuation-in-part of application No. 08/994,215, filed on Dec. 19, 1997.

(51) Int. Cl.$^7$ .................................................. F02D 29/06
(52) U.S. Cl. .............................................. 290/7; 60/39.05
(58) Field of Search ................................. 290/7, 39.511, 290/39.55, 39.05, 39.53, 39.59

(56) References Cited

U.S. PATENT DOCUMENTS

| | | | |
|---|---|---|---|
| 2,115,338 | * | 4/1938 | Lysholm .......................... 60/39.03 |
| 3,895,492 | * | 7/1975 | Forster et al. .................... 60/659 |
| 4,041,699 | * | 8/1977 | Schelp ............................. 60/39.55 |
| 4,426,842 | * | 1/1984 | Collet ............................... 60/39.511 |
| 4,506,509 | * | 3/1985 | Kronogård et al. ............. 60/720 |
| 4,702,074 | * | 10/1987 | Munk ............................... 60/39.511 |
| 4,754,607 | * | 7/1988 | Mackay ........................... 60/723 |
| 4,773,846 | * | 9/1988 | Munk ............................... 431/4 |
| 5,193,337 | * | 3/1993 | Harboe et al. ................... 60/39.03 |
| 5,274,995 | * | 1/1994 | Horner et al. ................... 60/39.55 |
| 5,497,615 | * | 3/1996 | Noe et al. ........................ 60/39.511 |
| 5,932,940 | * | 8/1999 | Epstein et al. .................. 310/40 MM |
| 6,066,898 | * | 5/2000 | Jensen ............................. 290/52 |
| 6,073,857 | * | 6/2000 | Gordon et al. .................. 237/12.1 |
| 6,125,625 | * | 10/2000 | Lipinski et al. ................ 60/39.141 |

* cited by examiner

*Primary Examiner*—Joseph Waks
(74) *Attorney, Agent, or Firm*—Ephaim Starr; Steve Slusher

(57) ABSTRACT

A microturbine power generation system includes an electrical generator, a turbine, a compressor and a combustor. Hot expanding gases leaving the combustor are expanded by the turbine. The resulting turbine power is used for driving the compressor and the electrical generator. A recuperator recovers heat from a turbine exhaust stream and raises the temperature of compressed air prior to combustion. Fluid injection is accomplished in the system by using one or more nozzles to spray small fluid droplets, on the order of hundreds of microns or less in diameter, into the combustion air either upstream or downstream of the compressor, or both. The evaporative effect of the injected fluid is used to cool the generator components and to increase the effectiveness of the recuperator. The injected fluid also adds mass to the hot, expanding gases entering the turbine.

25 Claims, 2 Drawing Sheets

FOG CYCLE FOR MICROTURBINE POWER GENERATING SYSTEM

CROSS REFERENCE TO RELATED INVENTIONS

This application is a continuation-in-part, and claims the benefit of the filing date, of co-pending non-provisional application Ser. No. 08/994,215, filed on Dec. 19, 1997. The present application is commonly assigned with the earlier application and has one common inventor with the earlier application.

FIELD OF THE INVENTION

The present invention relates generally to microturbine power generating systems as defined herein. Specifically, the present invention relates to unique and non-obvious methods of increasing the efficiency of microturbines and for providing beneficial cooling to various microturbine components.

BACKGROUND OF THE INVENTION

The United States Electric Power Research Institute (EPRI) which is the uniform research facility for domestic electric utilities, predicts that up to 40% of all new generation could be provided by distributed generators by the year 2006. In many parts of the world, the lack of electric infrastructure (transmission and distribution lines) will greatly expedite the commercialization of distributed generation technologies since central plants not only cost more per kilowatt, but also must have expensive infrastructure installed to deliver the product to the consumer.

Relatively small, multi-fuel, modular distributed power generation units commonly called "microturbines" could help alleviate current afternoon brownouts and blackouts prevalent in many parts of the world. Microturbines are a new technology being developed to serve as auxiliary power units, on-site generators, and automotive power plants. Microturbines typically have a maximum power output of about one megawatt. "Turbogenerators" are microturbines, characterized by the following features: (a) a single, integral shaft on which a compressor, turbine and generator are located; (b) the compressor and turbine are of single stage, radial design; (c) the shaft rotates at speeds in excess of 35,000 rpm at full power; (d) an inverter may be used to reduce frequency to typical utility-grade operating parameters, typically 50 or 60 hertz; and (e) a recuperator or regenerator is normally used to bolster efficiency. Both turbogenerators and microturbines can be further characterized as having high power density, compact design and the ability to burn a wide variety of fuels in an external combustor. Some microturbines may be more complex and have features that deviate from the features that characterize a turbogenerator—for instance, they may use multiple shafts, a gear reduction box, and may have an axial flow turbine wheel. Regardless, microturbines may all be characterized in that they are relatively compact gas turbine power generators having no more than one expansion stage, either radial or axial flow, per shaft.

The single moving part concept of a one-shaft microturbine can enable low technical skill maintenance, and the projected low overall cost of such microturbines is expected to allow for widespread purchase in those parts of the world where capital is sparse. In addition, given the United States' emphasis on electric deregulation and the world trend in this direction, consumers of electricity would have not only the right to choose the correct method of electric service but also a new cost effective choice from which to chose. U.S. Pat. No. 4,754,607, which is assigned to the assignee of the present invention, discloses a microturbine power generating system suitable for cogeneration applications.

Yet to make these units commercially attractive to consumers, improvements are needed in areas such as increasing fuel-efficiency, reducing size and weight, and lowering thermal signature, noise, maintenance and cost penalties. For example, increasing the amount of work extracted by the turbine would increase efficiency of the system and lower the cost of generating electrical power.

SUMMARY OF THE INVENTION

The present invention can be regarded as a microturbine power generating system including a compressor for compressing intake air during system operation; a recuperator for adding heat to air leaving the compressor; a combustor for producing hot, expanding gases by igniting fuel and air leaving a cold side of the recuperator; a turbine for converting the hot, expanding gases leaving the combustor into mechanical energy; and a power converter for converting the mechanical energy produced by the turbine into electrical energy. The system further includes components and controls for increasing the system's efficiency and for providing beneficial cooling of various components. These additional components and controls are used to accomplish injection of micronized fluid droplets into the combustion air stream at various locations within the system at various rates and droplet sizes. Water, which is the preferred injection fluid, adds mass to the hot, expanding gases entering the turbine, thus increasing the amount of work extracted by the turbine. It also increases the efficiency of the recuperator, and, in one embodiment, has the additional benefit of cooling the generator components.

DESCRIPTION OF THE PREFERRED EMBODIMENT

Figure 1:
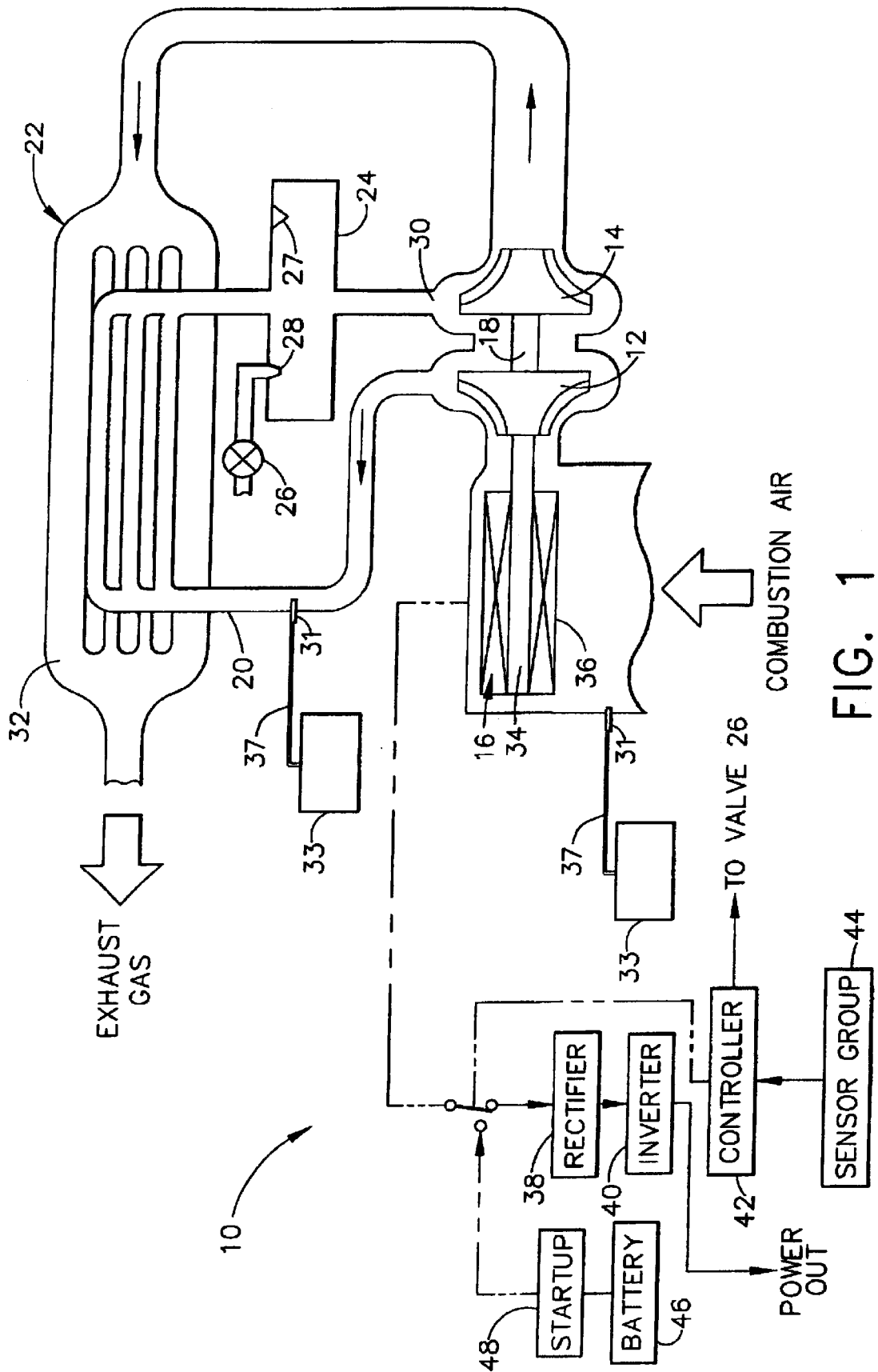
FIG. 1 is a block diagram of a power generating system according to the present invention.

Referring to FIG. 1, a power generating system 10 according to the present invention is illustrated. The power generating system 10 includes a compressor 12, a turbine 14 and an electrical generator 16. The electrical generator 16 is cantilevered from the compressor 16. The compressor 12, the turbine 14 and the electrical generator 16 can be rotated by a single shaft 18. Although the compressor 12, turbine 14 and electrical generator 16 can be mounted on separate shafts, the use of a single common shaft 18 for rotating the compressor 12, the turbine 14 and the electrical generator 16 adds to the compactness and reliability of the power generating system 10.

Figure 2:
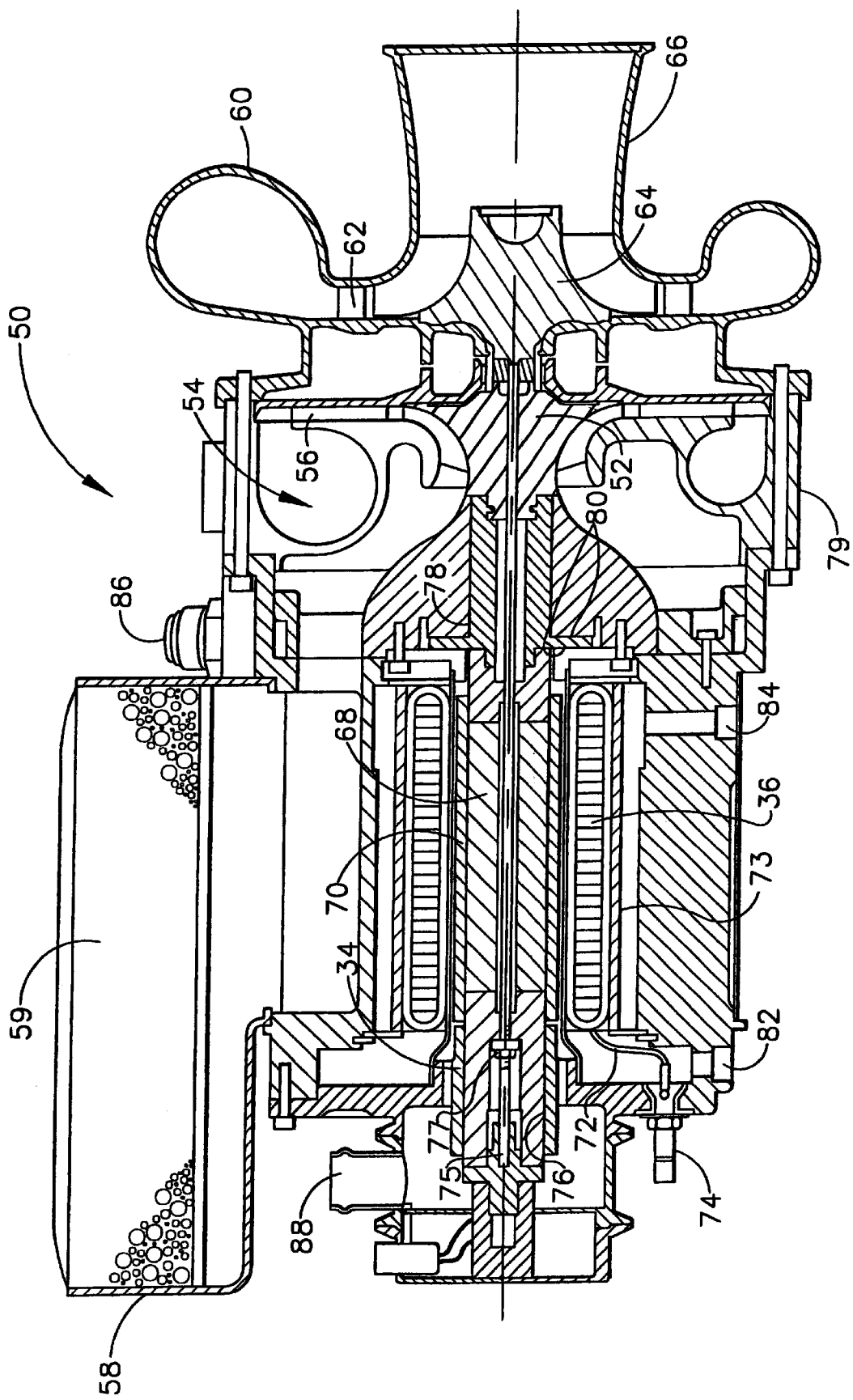
FIG. 2 is a cross-section view of an engine core for the microturbine power generating system.

The shaft 18 can be supported by self-pressurized air bearings such as foil bearings. As is shown in FIG. 2, the shaft 18 is supported by journal foil bearings 76 and 78 and thrust foil bearings 80. The foil bearings eliminate the need for a separate bearing lubrication system and reduce the occurrence of maintenance servicing.

Air entering an inlet of the compressor 12 is compressed. Compressed air leaving an outlet of the compressor 12 is circulated through cold side passages 20 in a cold side of a recuperator 22. In the recuperator 22, the compressed air absorbs heat, which enhances combustion. The heated, compressed air leaving the cold side of the recuperator 22 is supplied to a combustor 24.

Fuel is also supplied to the combustor 24. Both gaseous and liquid fuels can be used. In gaseous fuel mode, any suitable gaseous fuel can be used. Choices of fuel include diesel, flair gas, off gas, gasoline, naphtha, propane, JP-8, methane, natural gas and other man-made gases.

The flow of fuel is controlled by a fuel system that uses flow control valve 26. The fuel is injected into the combustor 24 by an injection nozzle 28. Although FIG. 1 shows the fuel system as injecting fuel directly into combustor 24, other arrangements for a fuel system can be used depending upon the type of fuel. For instance, when natural gas is the selected fuel, the fuel system can inject the fuel into the combustion air stream upstream of the compressor 12. This allows the compressor 12 to compress the fuel in addition to the combustion air, and reduces or eliminates the need for a separate natural gas compressor that would otherwise be required if the natural gas delivery system (such as a gas utility system) does not provide sufficient pressure on its own.

Inside the combustor 24 the fuel and compressed air are mixed and ignited by an igniter 27 in an exothermic reaction. In the preferred embodiment, the combustor 24 contains a suitable catalyst capable of combusting the compressed, high temperature, fuel-air mixture at the process conditions. Some known catalysts usable in the combustor 24 include platinum, palladium, as well as metal oxide catalysts with active nickel and cobalt elements.

After combustion, hot, expanding gases resulting from the combustion are directed to an inlet nozzle 30 of the turbine 14. The inlet nozzle 30 preferably has a fixed geometry. The hot, expanding gases resulting from the combustion are expanded through the turbine 14, thereby creating turbine power. The turbine power, in turn, drives the compressor 12 and the electrical generator 16.

Turbine exhaust gas is circulated by hot side passages 32 in a hot side of the recuperator 22. Inside the recuperator 22, heat from the turbine exhaust gas on the hot side is transferred to the compressed air on the cold side. In this manner, some heat of combustion is recuperated and used to raise the temperature of the compressed air en route to the combustor 24. After surrendering part of its heat, the gas exits the recuperator 22. Additional heat recovery stages could be added onto the power generating system 10.

The system 10 further includes one or more spray nozzles 31 for spraying a fluid that has been sufficiently pressurized to enable the fluid to be separated into very small diameter droplets. These fine droplets are normally measured in microns, hence the concept of "micronized" fluid injection. Thus, as used herein, a "micronized fluid" is a fluid that is introduced into the microturbine power generating system in fluid droplets generally on the order of hundreds of microns or less in diameter. The preferred size varies depending upon temperature and pressure conditions, but the droplets should be of sufficiently small size to ensure rapid evaporation. After passing through the nozzles 31, the micronized fluid is then evaporated into the combustion air stream downstream of the compressor 12 and upstream of the cold side of the recuperator 22. Further enhancement to the cycle is achieved by additional injection, thereby evaporating additional fluid, upstream of the compressor 12 air flow and upstream of the generator 16. The fluid evaporation upstream of the compressor 12 has the primary advantageous effect of cooling the air into the compressor 12, which both minimizes compressor work and provides relatively cold air to the generator for improved cooling thereof. The fluid evaporation downstream from the compressor 12 and upstream the cold side of the recuperator 22 has the primary advantageous effects of increasing the mass flow rate to the turbine 14 and lowering the temperature of the air stream to the recuperator 22.

Lowering the temperature of the air stream to the recuperator 22 allows for greater heat recovery in the recuperated cycle of the microturbine. Consequently, the recuperator 22 becomes more effective and captures more of the waste heat discharged from the turbine exhaust. Efficiency of this microturbine Brayton cycle is increased because additional heat is injected into the cycle (i.e., additional heat is recovered from the waste heat), and the total output of the cycle is increased because mass flow rate has been increased through the turbine 14. The mass flow rate through the turbine 14 does not increase the amount of compressor work when the mass flow increase comes from the evaporative fluid that is injected downstream of the compressor 12.

The mass flow rate of the injected fluid is limited by the relative humidity ratio of the dry air and fluid. The fluid is injected into the power generating system 10 until the saturation limit is reached, that is, unit the relative humidity is 1.0 or as close to this limit as can readily be achieved in practice. The present invention is similar to the known Humid Air Turbine (HAT) cycle, which has been used successfully in conventional combustion turbines to increase humidity ratios and mass flow rates therein, but which has not been used in microturbines. Thus, unlike the HAT cycle, the present invention applies to microturbines as defined herein, and not to conventional combustion turbines having multiple axial flow turbine wheels on a common shaft or on multiple shafts. An additional unique aspect of the present invention is that the humidification described herein is carried out via the stream injection of micronized fluid, whereas in HAT cycles, humidification is achieved by cascading water in separate, pressurized and dedicated vessels or tanks.

In the preferred embodiment, the micronized fluid is fresh water having low mineral content, which helps to avoid mineral build up on the components of the microturbine power generating system 10. Untreated tap water and well water can also be used, as can other evaporative fluids provided that they would enhance the overall cycle in performance, including higher power output, efficiency gains, or cooling effect. When tap or well water is used, a purification process such as filtration, reverse osmosis or demineralization may also be required to preserve the useful life of the system components or to increase the time needed between maintenance intervals. Other fluids that may be used to enhance the evaporation rate include refrigerants, although a recovery process for these fluids may be necessary to make their use economically attractive. Such recovery means include known means commonly used in connection with conventional gas turbines. However, water is the preferred fluid because it has the obvious relative benefits of being readily available and benign from an emissions stand point, compared to other fluids.

In addition, fuel may also be mixed with the selected fluid and injected upstream the compressor 12, or, alternatively, fuel could be injected upstream of the compressor 12 and the selected fluid injected upstream the cold side of the recuperator 22. Such mixing inhibits flame propagation (flashback) from the primary combustor 24 back through recuperator 22. This arrangement allows a gaseous fuel to be compressed in the compressor 12 with the combustion air, thereby reducing or eliminating the need for a separate fuel gas compressor.

In the representative schematic of the invention shown in FIG. 1, the two basic embodiments of the power generating system 10 are depicted. These embodiments, which involve different injection points, can be used independently or simultaneously. In the first embodiment the water is injected into the system upstream of the compressor 12, and in the second embodiment the water is injected downstream of the compressor 12 and upstream of the cold side passages 20 of the recuperator 22.

The means of carrying out injection in both embodiments is similar. A pressurized water source 33 is connected via conduit 37 to the spray nozzle 31, which extends into the combustion air stream at a specific location. In the first embodiment, this specific location is selected both to maximize the cooling effect of vaporization proximate the generator 16 and to ensure that the micronized water is substantially mixed with the combustion air by the time it reaches the compressor 12.

In the second embodiment, spray nozzle 31 preferably injects the water into the combustion air a far enough distance upstream (e.g., several pipe diameters) of the cold side passages 20 of the recuperator 22 to ensure substantial mixing of the micronized water and the compressed air, although the water droplets should be small enough upon injection to ensure rapid humidification of the combustion air regardless of this distance. Some evaporation of the injected water may not take place until it reaches the recuperator 22, however, depending upon the design of the recuperator 22, size of the injected droplets and method of injection, no significant deleterious effects will occur.

The pressurized water source 33 can be a pressurized tank or, preferably, a connection to a city or local water supply. The selection of the pressurized water source depends on availability of a water system with sufficient pressure to spray the water in micronized fashion into the power generating system 10. If the power generating system 10 is designed for remote locations without local plumbing, a pressurized tank is used and can be operated with electricity produced by the power generating system 10. Although FIG. 1 depicts two pressurized water sources 33, a single tank or single connection to a water supply can be used. In that case, separate control of the injection both before and after the compressor 12 is accomplished through modulation of the separate spray nozzles 31. In both embodiments, conduit 37 can be a pipe, flexible metal coupling, or temperature-resistant hose. The spray nozzles 31 are preferably of a design that is commercially available. However, other means of injection may be used provided that the pressure of the injected fluid is sufficient to allow the formation of micronized fluid droplets. Further, in addition to using high pressure atomization methods, micronized droplets can be generated using ultrasonic methods or various methods of mechanical separators.

Additional aspects of the microturbine power generating system 10 further distinguish the present invention from water injection systems used in conventional gas turbine generators. The generator 16 of the present invention can be a ringwound, two-pole toothless (TPTL) or multi-tooth (TPMT) brushless permanent magnet machine having permanent magnet rotor 34 and stator windings 36. The turbine power generated by the rotating turbine 14 is used to rotate the rotor 34. The rotor 34 is attached to the shaft 18. When the rotor 34 is rotated by the turbine power, an alternating current is induced in the stator windings 36. Speed of the turbine 14 can be varied in accordance with external energy demands placed on the system 10. Variations in the turbine speed will produce a variation in the frequency of the alternating current (i.e., wild frequencies) generated by the electrical generator 16. Regardless of the frequency of the dc power generated by the electrical generator 16, the ac power can be rectified to dc power by a rectifier 38, and then chopped by a solid-state electronic inverter 40 to produce ac power having a fixed frequency. Accordingly, when less power is required, the turbine speed can be reduced without affecting the frequency of the ac output. Moreover, reducing the turbine speed reduces the airflow because the compressor runs slower. Consequently, the turbine inlet temperature remains essentially constant, thus maintaining a high efficiency at part load.

Use of the rectifier 38 and the inverter 40 allows for wide flexibility in determining the electric utility service to be provided by the power generating system of the present invention. Because any inverter 40 can be selected, the consumer can select frequency of the ac power. If there is a direct use for ac power at wild frequencies, the rectifier 38 and inverter 40 can be eliminated.

The power generating system 10 can also include a battery 46 for providing additional storage and backup power. When used in combination with the inverter 40, the combination can provide uninterruptible power after generator failure.

During operation of the power generating system 10, heat is generated in the electrical generator 16 due to inefficiencies in generator design. In order to extend the life of the electrical generator 16, as well as to capture useful heat, compressor inlet air flows over the generator 16 and absorbs excess heat from the generator 16. The rectifier 38 and the inverter 40 can also be placed in the air stream. After the air has absorbed heat from the aforementioned sources, it is compressed in the compressor 12 and further pre-heated in the recuperator 22.

A controller 42 controls the turbine speed by controlling the amount of fuel flowing to the combustor 24. The controller 42 uses sensor signals generated by a sensor group 44 to determine the external demands upon the power generating system 10. The sensor group 44 could include sensors such as position sensors, speed sensors and various temperature and pressure sensors for measuring operating temperatures and pressures in the system 10. Using the aforementioned sensors, the controller 42 controls both startup and optimal performance during steady state operation. The controller 42 can also determine the state of direct current storage in the battery 46 if supplied in the inverter 40, and adjust operations to maintain conditions of net charge, net drain, and constant charge of the battery.

A switch/starter control 48 can be provided offskid to start the power generating system 10. Rotation of the compressor 12 can be started by using the generator 16 as a motor. During startup, the switch/starter control 48 supplies an excitation current to the stator windings 34 of the electrical generator 16. The battery 46 supplies startup power. In the alternative, a compressed air device could be used to motor the power generating system 10.

Referring to FIG. 2, the "engine core" 50 of the power generating system 10 is shown. The compressor section includes an impeller 52 having a bore, a compressor scroll 54 and a diffuser channel 56. Air entering an air inlet 58 is filtered by an air filter 59 and directed to the compressor scroll 54. Air flowing out of the compressor scroll 54 is directed to the recuperator (not shown in FIG. 2).

The turbine section includes a turbine scroll 60, a plurality of fixed nozzle vanes 62, and a boreless turbine wheel 64. Hot expanding gases leaving the combustor (not shown in FIG. 2) are directed into the turbine scroll 60 and through the nozzle vanes 62, which redirect the hot expanding gas onto the turbine wheel 64. Turbine exhaust gas leaves the turbine section through an exhaust diffuser 66, which reduces the temperature and noise of the turbine exhaust gas.

The rotor 34 of the electrical generator 16 includes magnets 68 made of a rare earth material such as samarium cobalt. The magnets 68 are surrounded by a containment sleeve 70 made of a non-magnetic material such as Inconel 718. The stator windings 36 are housed in a generator housing 73. The rotor 34 has a bore and an optional containment sleeve (not shown) contacting a surface of the bore. Power conductors 72 extend from the stator windings 36 and terminate in a power connector stud 74, which is secured to the base 79. The base 79 provides support for a fuel inlet, the air inlet 58, the compressor 12, the turbine 14, the generator 16, the recuperator 22, the combustor 24, the rectifier 38, and the inverter 40, to enable the system 10 to exist as a packaged unit.

The single shaft 18 is shown in FIG. 2 as a tieshaft 75, which extends through the bores in the rotor 34 and the compressor impeller 52. The tieshaft 75 is thin, having a diameter of approximately 0.25 inches to 0.5 inches. The bores have clearances that allow the tieshaft 75 to extend through the rotor 34 and the impeller 52. However, the tieshaft 75 does not extend through the turbine wheel 64. Instead, the tieshaft 75 is secured to the turbine wheel 64. The tieshaft 75 can be secured to the center of the turbine wheel hub by an inertia weld. Thus, the turbine wheel 64 is boreless in that it does not have a bore through which the tieshaft 75 extends. Eliminating the bore reduces stresses in the turbine wheel 64.

When clamped together by the tieshaft 75, the compressor impeller 52, the turbine wheel 64 and the rotor 34 are rotated as a single unit. Under high operating temperatures and rotational speeds, however, the impeller 52, the turbine wheel 64 and the rotor 34 tend to expand and grow apart. Flexing of the tieshaft 75 during operation also tends to separate the faces. To maintain contact between the faces of the impeller 52, the turbine wheel 64 and the rotor 34 at high rotational speeds (65,000 rpm and above), the tieshaft 75 is preloaded. For example, a tieshaft 75 made of Inconel 718 can be preloaded in tension, or prestressed, to about 90% of yield strength. During assembly, the tieshaft 75 is preloaded, the impeller 52 and the rotor 34 are slid over the tieshaft 75, and a nut 77 is secured to a threaded end of the tieshaft 75. The tension in the tieshaft 75 is maintained as the nut 77 is turned.

The rotating unit 52, 64, 34 and 75 is supported in a radial direction by inboard and outboard foil journal bearings 76 and 78. The rotating unit 52, 64, 34 and 75 is supported in an axial direction by a foil thrust bearing 80.

Various coolant ports are provided for the engine core 50. Provided are ports 82 and 84 for circulating a coolant over the stator windings 40. Also provided are ports 86 and 88 for circulating a coolant over the foil bearings 76, 78 and 80.

The power generating system 10 can be built in several major modules such as a rotating module, a heat exchanger module, a combustor module, and an electronics module. Each of these modules is relatively lightweight and compact. The modules can be replaced without breaking liquid lines. The use of foil bearings 76, 78 and 80 eliminates the need for an oil-based lubrication system and, therefore, results in low maintenance of the power generating system 10. Scheduled maintenance would consist primarily of replacing the igniter 27, the filter 59 and catalyst elements (if any) in the combustor 24.

The high power density and low weight of the technology is made possible through the high speed components which permits large amounts of power using a minimum of material. The unit is completely self-contained in a weatherproof enclosure. The power generating system 10 is "plug and play," requiring little more than a supply of clean fuel, liquid or gas.

The power generating system 10 can use multiple fuels including natural gas, diesel and JP-8. The power generating system 10 has a low thermal signature and minimal noise generation. The use of air bearings eliminates the need for an oil-based lubrication system. The electrical generation system 10 has high reliability and minimal service requirements due to single moving part design. The use of a solid-state electronic inverter 40 allows the system 10 to provide a variable ac output. Installation is easy due to a modular and self-contained design, and servicing is easy because the core 50 has one moving part and major parts that are easily accessible. The width, length and height of the engine core 50 can be adjusted to fit a wide variety of dimensional requirements.

The power generating system 10 is smaller, lighter, more fuel-efficient and has lower thermal signature, noise, maintenance and cost penalties than comparable internal combustion engines. Therefore, due to its low installation costs, high efficiency, high reliability and simple, low cost maintenance, the power generating system 10 provides lower operating and fixed costs than power generators of comparable size.

Potential applications for the power generating system 10 are many and diverse. Applications include use in off-grid applications for standalone power, on-grid applications for peak shaving, load following or base load service, emergency back-up and uninterruptible power supply, prime mover applications (e.g., pump, air conditioning) and automotive hybrid vehicles.

The invention is not limited to the specific embodiments disclosed above. For example, the present invention could be configured without the electrical generator 18. Turbine power would be transmitted and applied directly, as in the case of a mechanically driven refrigeration system. Therefore, the present invention is construed according to the claims that follow.

What is claimed is:

1. A microturbine power generating system with a maximum power output of about one megawatt comprising:

a compressor for compressing a combustion air during system operation;

a combustor receiving the combustion air from the compressor, said combustor producing hot, expanding gases by igniting a fuel with the combustion air;

a turbine receiving the hot, expanding gases, the turbine converting the hot, expanding gases into a mechanical energy and discharging said gases as a turbine exhaust;

a power converter operably connected to the turbine, the power converter converting the mechanical energy produced by the turbine into an electrical energy, said power converter located upstream in the combustion air stream from said compressor;

a recuperator operably positioned between the compressor and the turbine, the recuperator having cold side passages and hot side passages arranged in a heat transfer relationship, the cold side passages operably connected to the compressor to receive the combustion air downstream of the compressor and the hot side passages operably connected to the turbine to receive the turbine exhaust;

a fluid source for supplying an evaporative fluid; and means for injecting the evaporative fluid into the combustion air stream upstream of the compressor and the power converter as a micronized fluid;

whereby the evaporative fluid cools the power converter.

2. The system of claim 1, further comprising means for injecting a remaining portion of the evaporative fluid into the combustion air stream downstream of the compressor and upstream the cold side passages of the recuperator.

3. The system of claim 1, wherein the injecting means comprises at least one nozzle operably connected upstream of the compressor and the power converter to inject the evaporative fluid into the combustion air stream upstream of the compressor and the power converter.

4. The system of claim 3, wherein the power converter comprises a permanent magnet rotor rotatably positioned within a stator, and further comprising a single shaft connecting the turbine and rotor.

5. The system of claim 1, further comprising a fuel system operably connected upstream of the compressor to deliver fuel to the combustion air stream upstream of the compressor at a location proximate to the point at which the evaporative fluid is injected.

6. The system of claim 1, wherein the fluid is a refrigerant.

7. The system of claim 1, wherein the power converter comprises a permanent magnet rotor rotatably positioned within a stator, and further comprising a single shaft connecting the turbine and rotor.

8. The system of claim 7, wherein the fluid source is a local water supply.

9. The system of claim 7, wherein the fluid source is a pressurized water tank.

10. A turbogenerator, comprising:

a compressor for compressing a combustion air during operation of the turbogenerator;

a combustor for producing hot, expanding gases by igniting a fuel and the combustion air;

a turbine, the turbine converting the hot, expanding gases leaving the combustor into a mechanical energy and discharging said gases as a turbine exhaust;

a power converter located upstream in the combustion air stream from the compressor, the power converter converting the mechanical energy produced by the turbine into an electrical energy, wherein a single shaft connects the compressor, turbine and power converter, and wherein the power converter and the compressor rotate in unison with the turbine;

a recuperator operably positioned between the compressor and the turbine, the recuperator having cold side passages and not side passages arranged in a heat transfer relationship, the cold side passages operably connected to the compressor to receive the combustion air downstream of the compressor and the hot side passages operably connected to the turbine to receive the turbine exhaust;

a fluid source for supplying an evaporative fluid; and means for injecting the evaporative fluid into the combustion air stream upstream of the compressor and the power converter as a micronized fluid;

whereby the evaporative fluid cools the power converter.

11. The turbogenerator of claim 10, further comprising means for injection the evaporative fluid downstream of the compressor and upstream of the cold side passages of the recuperator.

12. The turbogenerator of claim 11, wherein the power converter comprises a permanent magnet rotor rotatably positioned within a stator; wherein the turbine, the rotor, and the compressor are connected on the shaft in prestressed relation.

13. The turbogenerator of claim 10, wherein the evaporative fluid is a refrigerant.

14. The turbogenerator of claim 10, wherein the means for injecting the evaporative fluid comprises one or more spray nozzles connected to inject the evaporative fluid into the combustion air stream upstream of the compressor and the power converter.

15. The turbogenerator of claim 10, further comprising a fuel system operably connected to deliver fuel to the combustion air stream upstream of the compressor at a location proximate to the point at which the evaporative fluid is injected.

16. The turbogenerator of claim 10, wherein the evaporative fluid is a consumable evaporative fluid, the combustor burning the consumable evaporative fluid with the combustion air and fuel.

17. The turbogenerator of claim 10, wherein the fluid source comprises a local water supply.

18. A microturbine power generating system with a maximum power output of about one megawatt comprising:

a compressor for compressing a combustion air during system operation;

a combustor receiving the combustion air from the compressor, said combustor producing hot, expanding gases by igniting a fuel with the combustion air;

a turbine receiving the hot, expanding gases, the turbine converting the hot, expanding gases into a mechanical energy and discharging said gases as a turbine exhaust;

a power converter operably connected to the turbine, the power converter converting the mechanical energy produced by the turbine into an electrical energy, said power converter located upstream in the combustion air stream from said compressor;

a recuperator operably positioned between the compressor and the turbine, the recuperator having cold side passages and hot side passages arranged in a heat transfer relationship, the cold side passages operably connected to the compressor to receive the combustion air downstream of the compressor and the hot side passages operably connected to the turbine to receive the turbine exhaust;

a fluid source for supplying an evaporative fluid;

means for injecting the evaporative fluid into the combustion air stream upstream of the compressor as a micronized fluid;

a fuel system operably connected upstream of the compressor to deliver fuel to the combustion air stream at a location proximate to the point at which the evaporative fluid is injected.

19. The system of claim 18, wherein the power converter comprises a permanent magnet rotor rotatably positioned within a stator.

20. The system of claim 18, wherein the evaporative fluid is injected upstream of the power converter.

21. The system of claim 18, wherein the means for injecting the evaporative fluid comprises one or more spray nozzles connected to inject the evaporative fluid into the combustion air stream.

22. A turbogenerator, comprising:

a compressor for compressing a combustion air during operation of the turbogenerator;

a combustor for producing hot, expanding gases by igniting a fuel and the combustion air;

a turbine, the turbine converting the hot, expanding gases leaving the combustor into a mechanical energy and discharging said gases as a turbine exhaust;

a power converter located upstream in the combustion air stream from the compressor, the power converter converting the mechanical energy produced by the turbine into an electrical energy, wherein a single shaft connects the compressor, turbine and power converter, and wherein the power converter and the compressor rotate in unison with the turbine;

a recuperator operably positioned between the compressor and the turbine, the recuperator having cold side passages and not side passages arranged in a heat transfer relationship, the cold side passages operably connected to the compressor to receive the combustion air downstream of the compressor and the hot side passages operably connected to the turbine to receive the turbine exhaust;

a fluid source for supplying an evaporative fluid;

means for injecting the evaporative fluid into the combustion air stream upstream of the compressor as a micronized fluid; and a fuel system operably connected to deliver fuel to the combustion air stream at a location proximate to the point at which the evaporative fluid is injected.

23. The turbogenerator of claim 22, wherein the power converter comprises a permanent magnet rotor rotatably positioned within a stator.

24. The turbogenerator of claim 22, wherein the evaporative fluid is injected upstream of the power converter.

25. The turbogenerator of claim 22, wherein the means for injecting the evaporative fluid comprises one or more spray nozzles connected to inject the evaporative fluid into the combustion air stream.

* * * * *